(12) United States Patent
Luo et al.

(10) Patent No.: US 8,432,873 B2
(45) Date of Patent: Apr. 30, 2013

(54) METHOD AND APPARATUS FOR COMPUTING AND REPORTING CHANNEL QUALITY INDICATION (CQI)

(75) Inventors: Tao Luo, San Diego, CA (US); Taesang Yoo, San Diego, CA (US); Wanshi Chen, San Diego, CA (US); Peter Gaal, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 461 days.

(21) Appl. No.: 12/652,605

(22) Filed: Jan. 5, 2010

(65) Prior Publication Data

US 2010/0177653 A1 Jul. 15, 2010

Related U.S. Application Data

(60) Provisional application No. 61/144,099, filed on Jan. 12, 2009.

(51) Int. Cl.
*H04B 7/216* (2006.01)
(52) U.S. Cl.
USPC .......................................................... 370/335
(58) Field of Classification Search .................. 370/320, 370/328–339, 342; 375/140–148
See application file for complete search history.

(56) References Cited

U.S. PATENT DOCUMENTS

| 7,649,831 | B2 * | 1/2010 | Van Rensburg et al. | 370/203 |
| 7,751,368 | B2 * | 7/2010 | Li et al. | 370/332 |
| 7,920,511 | B2 * | 4/2011 | Khan et al. | 370/328 |
| 8,014,455 | B2 * | 9/2011 | Kim et al. | 375/260 |
| 8,036,131 | B2 * | 10/2011 | Roh et al. | 370/241 |
| 2008/0132281 | A1 | 6/2008 | Kim et al. | |
| 2008/0165875 | A1 * | 7/2008 | Mundarath et al. | 375/262 |
| 2008/0192718 | A1 * | 8/2008 | Jongren et al. | 370/342 |
| 2009/0067531 | A1 * | 3/2009 | Lee et al. | 375/267 |

FOREIGN PATENT DOCUMENTS

WO WO2008058112 5/2008

OTHER PUBLICATIONS

R1-070269, Multi-Codeword Principles for E-UTRA MIMO, 3GPP TSG RAN WG1 47bis, 5 pages, Jan. 2007.*
QUALCOMM Europe: ""System Operation of SU-MIMO and MU-MIMO"" 3GPP Draft; R1-062043, SRD Generation Partnership Project (3GPP), Mobile Competence Centre ; 650, Route Des Lucioles ; F-06921 Sophia-Antipolis Cedex ; France, vol. RAN WGl, No. Tallinn; 20060823, Aug. 23, 2006, [retrieved on Aug. 23, 2006].

(Continued)

*Primary Examiner* — Frank Duong
(74) *Attorney, Agent, or Firm* — Nerrie M. Zohn

(57) ABSTRACT

Techniques for computing and reporting channel quality indication (CQI) are described. In an aspect, a plurality of CQI computation methods may be supported, and each CQI computation method may indicate how CQI should be computed. One CQI computation method may be selected for use. CQI may then be computed and reported in accordance with the selected CQI computation method. In an exemplary design, a user equipment (UE) may obtain a selected method for computing CQI, which may be chosen based on the UE capability and/or other factors. The selected method may specify (i) CQI computation for a specific codeword among a plurality of codewords or (ii) CQI computation by averaging signal quality across a plurality of layers used for transmission. The UE may compute CQI in accordance with the selected method, send the CQI to a base station, and receive data sent by the base station based on the CQI.

36 Claims, 4 Drawing Sheets

OTHER PUBLICATIONS

Samsung: ""UE feedback and scheduling considerations for 4-Tx antenna MIMO"" 3GPP Draft; R1-063262, SRD Generation Partnership Project (3GPP), Mobile Competence Centre ; 650, Route Des Lucioles ; F-06921 Sophia-Antipolis Cedex ; France, vol. RAN WGI, No. Riga, Latvia; 20061101, Nov. 1, 2006 , [retrieved on Nov. 1, 2006 ].

3GPP TS 36.213 V8.5.0 (2008-12) 3rd Generation Partnership Project; Technical Specification Group Radio Access Network; Evolved Universal Terrestrial Radio Access (E-UTRA); Physical layer procedures (Release 8) 3RD Generation Partnership Project (3GPP); Technicalspecification (TS), XX, XX, [Online] vol. 36.213, No. TS 36.213 V8.5.0, Dec. 1, 2008, pp. 1-16, XP002572343 Retrieved from the Internet: URL:http://www.3gpp.org/ftp/Specs/archive/ 36_series/36.213/> [retrieved on Feb. 25, 2010] p. 33-p. 47.

International Search Report and Written Opinion—PCT/US2010/020615-ISA/EPO—Jun. 23, 2010.

\* cited by examiner

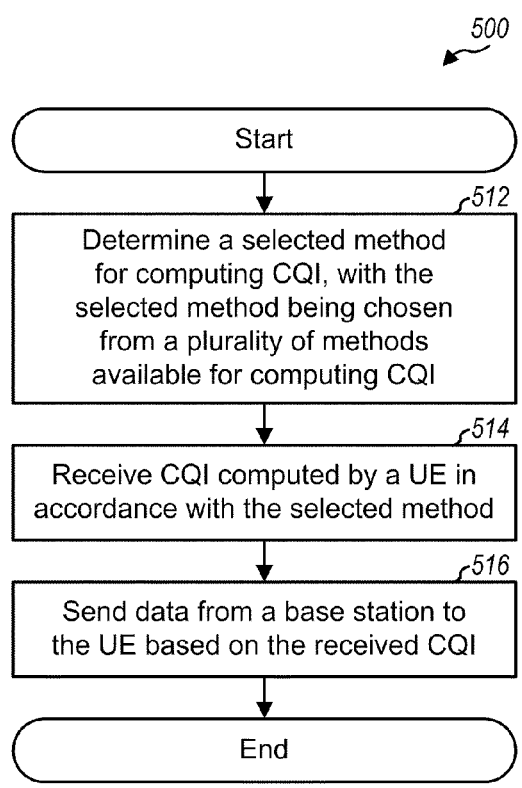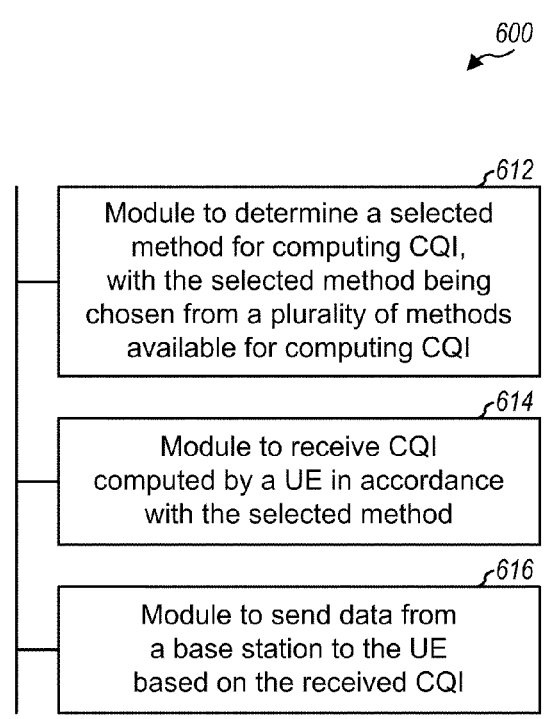
FIG. 5
FIG. 6

METHOD AND APPARATUS FOR COMPUTING AND REPORTING CHANNEL QUALITY INDICATION (CQI)

The present application claims priority to provisional U.S. Application Ser. No. 61/144,099, entitled "METHOD AND APPARATUS OF CHANNEL QUALITY INDICATION (CQI) COMPUTATION/REPORTING IN E-UTRAN," filed Jan. 12, 2009, and incorporated herein by reference.

BACKGROUND

I. Field

The present disclosure relates generally to communication, and more specifically to techniques for computing and reporting channel quality indication (CQI).

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A base station may transmit data on the downlink to a UE. Good performance may be achieved for downlink data transmission by having the UE estimate the quality of a communication channel from the base station to the UE, computing CQI based on the estimated channel quality, and sending the CQI to the base station. The CQI may indicate the estimated channel quality or a modulation and coding scheme that may be used for data transmission on the communication channel. It may be desirable to accurately compute and efficiently report CQI.

SUMMARY

Techniques for computing and reporting CQI for wireless communication are described herein. A base station may be able to simultaneously transmit a plurality of codewords to a UE. A codeword may also be referred to as a packet, a data block, etc. A single CQI may be computed and reported for the plurality of codewords.

In an aspect, a plurality of CQI computation methods may be supported, and each CQI computation method may indicate how CQI should be computed. One CQI computation method may be selected for use. CQI may then be computed and reported in accordance with the selected CQI computation method.

In an exemplary design, a UE may obtain a selected method for computing CQI, with the selected method being chosen from a plurality of methods available for computing CQI. The selected method may be (i) chosen by a base station and signaled to the UE or (ii) choose by the UE and signaled to the base station. The selected method may be chosen based on the capability of the UE, e.g., whether or not the UE supports successive interference cancellation (SIC). The UE may compute CQI in accordance with the selected method. In one design, the selected method may specify CQI computation for a specific codeword among a plurality of codewords. The UE may then compute CQI for the specific codeword based on its capability. In another design, the selected method may specify CQI computation by averaging signal quality across a plurality of layers used for transmission. The UE may then determine signal qualities of the plurality of layers based on its capability and may compute CQI based on an average of the signal qualities of the plurality of layers. For both designs, the UE may send the CQI to the base station and may thereafter receive data sent by the base station based on the CQI.

Various aspects and features of the disclosure are described in further detail below.

BRIEF DESCRIPTION OF THE DRAWINGS

FIGS. 5 and 6 show a process and an apparatus, respectively, for receiving CQI and transmitting data.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) in both frequency division duplexing (FDD) and time division duplexing (TDD) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
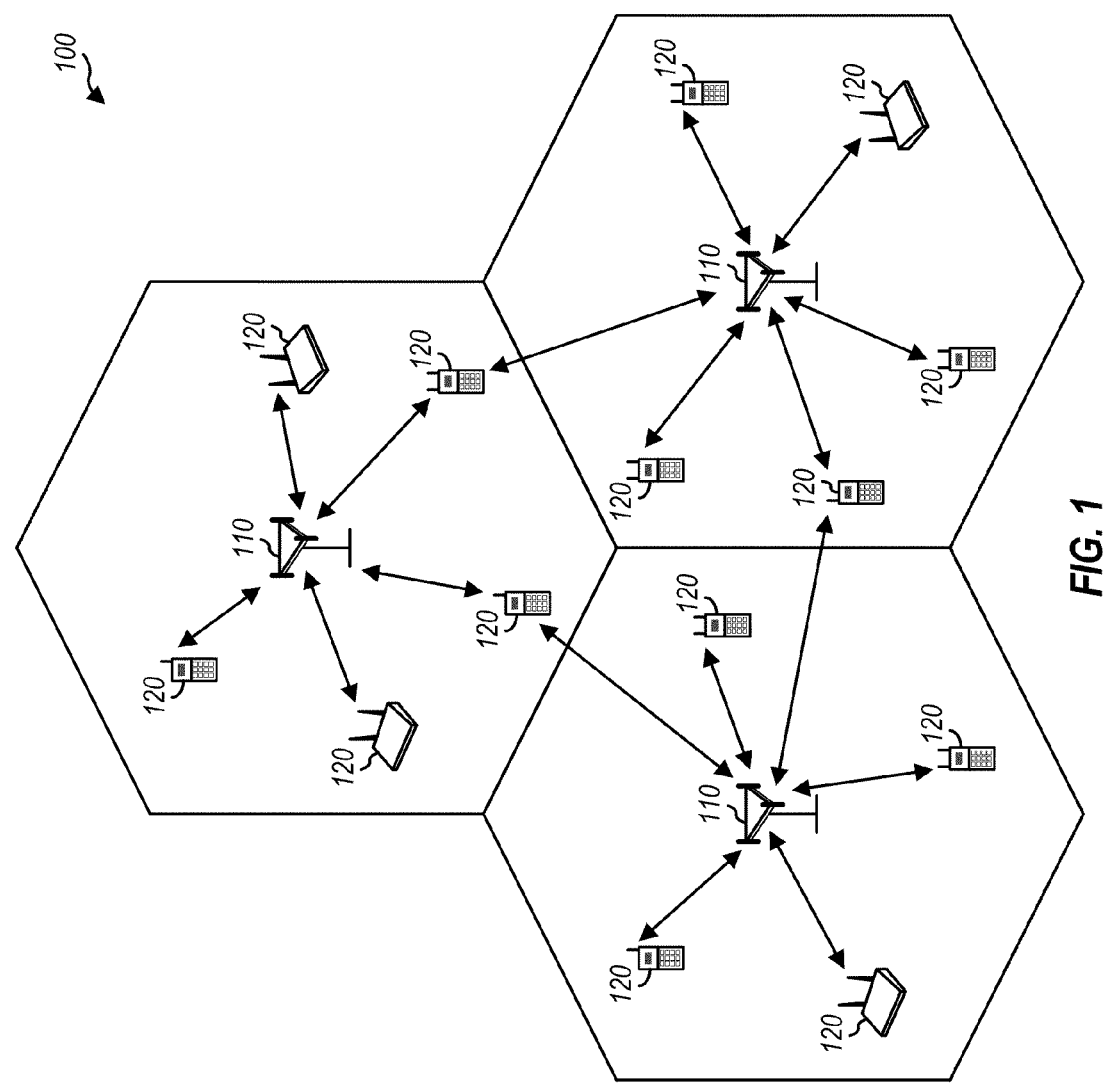
FIG. 1 shows a wireless communication network.

FIG. 1 shows a wireless communication network 100, which may be an Evolved Universal Terrestrial Radio Access Network (EUTRAN) utilizing LTE or some other wireless network. Network 100 may include a number of evolved Node Bs (eNBs) 110 and other network entities. An eNB may be a station that communicates with the UEs and may also be referred to as a Node B, a base station, an access point, etc. Each eNB 110 may provide communication coverage for a particular geographic area and may support communication for the UEs located within the coverage area.

UEs 120 may be dispersed throughout the wireless network, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

LTE utilizes orthogonal frequency division multiplexing (OFDM) on the downlink and single-carrier frequency division multiplexing (SC-FDM) on the uplink. OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM.

Figure 2:
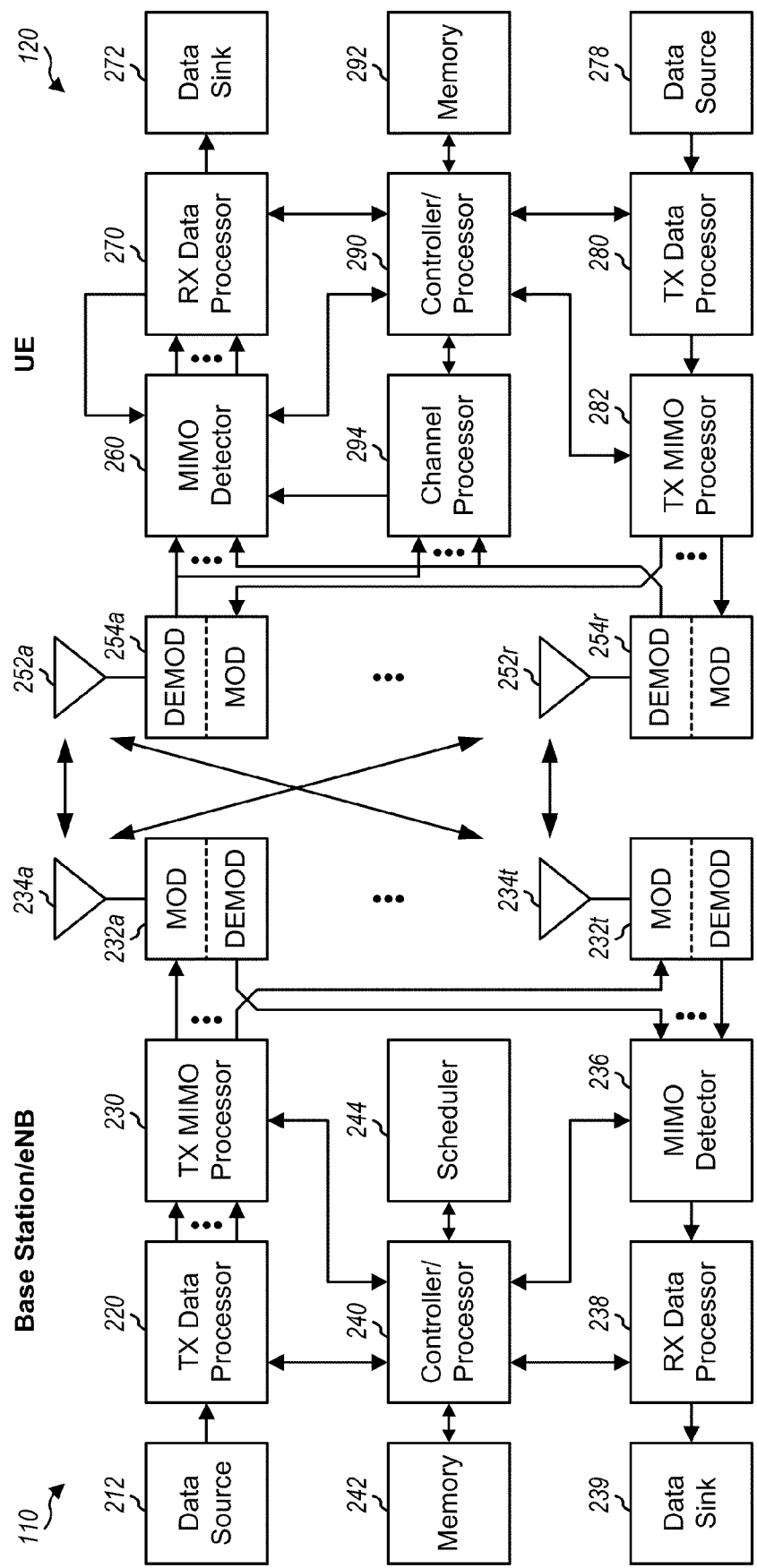
FIG. 2 shows a block diagram of a base station and a UE.

FIG. 2 shows a block diagram of a design of an eNB 110 and a UE 120, which may be one of the eNBs and one of the UEs in FIG. 1. eNB 110 may be equipped with multiple (T) antennas 234a through 234t, and UE 120 may be equipped with multiple (R) antennas 252a through 252r.

At eNB 110, a transmit (TX) data processor 220 may receive data from a data source 212 for one or more UEs, process (e.g., encode and modulate) the data for each UE based on one or more modulation and coding schemes selected for that UE, and provide data symbols for all UE. eNB 110 may also process control information and provide control symbols. A TX multiple-input multiple-output (MIMO) processor 230 may spatially process the data symbols, the control symbols, and reference symbols and provide T output symbol streams to T modulators (MOD) 232a through 232t. Each modulator 232 may process its output symbol stream (e.g., for OFDM) to obtain an output sample stream. Each modulator 232 may further condition (e.g., convert to analog, filter, amplify, and upconvert) its output sample stream and generate a downlink signal. T downlink signals from modulators 232a through 232t may be transmitted via T antennas 234a through 234t, respectively.

At UE 120, R antennas 252a through 252r may receive the T downlink signals from Node B 110, and each antenna 252 may provide a received signal to an associated demodulator (DEMOD) 254. Each demodulator 254 may condition (e.g., filter, amplify, downconvert, and digitize) its received signal to obtain samples and may further process the samples (e.g., for OFDM) to obtain received symbols. Each demodulator 254 may provide received data symbols to a MIMO detector 260 and provide received reference symbols to a channel processor 294. Channel processor 294 may estimate the response and quality of a MIMO channel from eNB 110 to UE 120 based on the received reference symbols. Channel processor 294 may provide a MIMO channel estimate to MIMO detector 260 and may provide channel quality estimates to a controller/processor 290. MIMO detector 260 may perform MIMO detection on the received data symbols based on the MIMO channel estimate and provide detected symbols. A receive (RX) data processor 270 may process (e.g., demodulate and decode) the detected symbols and provide decoded data for UE 120 to a data sink 272.

UE 120 may evaluate the channel conditions and generate feedback information, which may comprise CQI and other information. The feedback information and data from a data source 278 may be processed (e.g., encoded and modulated) by a TX data processor 280, spatially processed by a TX MIMO processor 282, and further processed by modulators 254a through 254r to generate R uplink signals, which may be transmitted via antennas 252a through 252r. At eNB 110, the R uplink signals from UE 120 may be received by antennas 234a through 234t, spatially processed by a MIMO detector 236, and further processed (e.g., demodulated and decoded) by an RX data processor 238 to recover the feedback information and data sent by UE 120. Controller/processor 240 may control data transmission to UE 120 based on the feedback information. The recovered data may be provided to a data sink 239.

Controllers/processors 240 and 290 may direct the operation at eNB 110 and UE 120, respectively. Memories 242 and 292 may store data and program codes for Node B 110 and UE 120, respectively. A scheduler 244 may schedule UE 120 and/or other UEs for data transmission on the downlink and/or uplink based on the feedback information received from all UEs.

eNB 110 may transmit data on L layers of a MIMO channel to UE 120, where in general $L \geq 1$. A layer may be considered as a spatial channel used for transmission. The number of layers (L) available for use may be dependent on various factors such as the number of transmit antennas (T) at eNB 110, the number of receive antennas (R) at UE 120, the channel conditions, and/or other factors and may be given as $L \min \geq \{T, R\}$.

eNB 110 may transmit K codewords simultaneously on the L layers to UE 120, where in general $K \geq 1$. Each codeword may be encoded and modulated by eNB 110 based on a modulation and coding scheme (MCS) selected for that codeword. Each codeword may be decoded separately by UE 120 to recover the data sent in that codeword. Table 1 shows a codeword-to-layer mapping supported by LTE for spatial multiplexing.

TABLE 1

Codeword-to-Layer Mapping for Spatial Multiplexing

| Number of Layers | Number of Codewords | Description |
|---|---|---|
| 1 | 1 | One codeword is mapped to one layer. |
| 2 | 2 | m-th codeword is mapped to m-th layer, for m = 1, 2. |
| 2 | 1 | Symbols with even indices in the codeword are mapped to first layer. Symbols with odd indices are mapped to second layer. |
| 3 | 2 | First codeword is mapped to first layer. Symbols with even indices in second codeword are mapped to second layer. Symbols with odd indices in second codeword are mapped to third layer. |
| 4 | 2 | First codeword is mapped to first and second layers. Second codeword is mapped to third and fourth layers. | eNB 110 may also transmit data to UE 120 using large delay cyclic delay diversity (CDD). For CDD, a phase ramp may be applied across subcarriers, and different phase ramps may be applied for different layers. If each layer corresponds to a different transmit antenna, then applying a phase ramp across subcarriers may be equivalent to cyclically shifting the time-domain samples of each OFDM symbol for each transmit antenna by an amount selected for that transmit antenna, with different cyclic shifts being applied for different transmit antennas. The magnitude of the phase ramp in the frequency domain is related to the amount of cyclic shift in the time domain. Large delay CDD refers to large phase ramps being applied to L-1 layers (with zero phase ramp being applied to the first layer) in order to achieve diversity, which may improve performance of data transmission.

eNB 110 may perform spatial processing for data transmission to UE 120, as follows:

$$y(k) = W(k)D(k)Ux(k), \quad \text{Eq (1)}$$

where
- x(k) is an L×1 vector containing L data symbols to be sent via L layers on subcarrier k in one symbol period,
- U is an L×L layer-to-virtual antenna mapping matrix,
- D(k) is an L×L CDD matrix for subcarrier k,
- W(k) is a T×L precoding matrix for subcarrier k, and
- y(k) is a T×1 vector containing T output symbols for the T transmit antennas on subcarrier k in one symbol period.

UE 120 may receive the data transmission from eNB 110. The received symbols at UE 120 may be expressed as:

$$r(k) = H(k)y(k) + n(k), \quad \text{Eq (2)}$$

where
- H(k) is an R×T channel matrix for the MIMO channel from eNB 110 to UE 120,
- r(k) is an R×1 vector containing R received symbols from the R received antennas on subcarrier k in one symbol period, and
- n(k) is an R×1 vector of noise and interference observed by UE 120.

UE 120 may perform MIMO detection for the received symbols as follows:

$$\hat{x}(k) = M(k)r(k), \quad \text{Eq (3)}$$

where
- M(k) is an L×R spatial filter matrix for subcarrier k, and
- $\hat{x}(k)$ is an L×1 vector of detected symbols, which is an estimate of x(k).

UE 120 may derive the spatial filter matrix M(k) based on minimum mean square error (MMSE), zero-forcing (ZF), maximal ratio combining (MRC), or some other MIMO detection technique known in the art. UE 110 may obtain L detected symbols for the L layers on each subcarrier k used for transmission based on the R received symbols for subcarrier k and the spatial filter matrix M(k) for subcarrier k. UE 120 may demap the detected symbols from the L layers to K codewords in a manner complementary to the mapping performed by eNB 110. UE 120 may then process (e.g., demodulate and decode) the detected symbols for each codeword to recover the data sent in the codeword.

UE 120 may also perform MIMO detection with successive interference cancellation (SIC). In this case, UE 120 may perform MIMO detection (e.g., based on MMSE) to obtain detected symbols for one codeword. UE 120 may process the detected symbols for the codeword to obtain decoded data. UE 120 may then estimate the interference due to the recovered codeword and may cancel the estimated interference from the received symbols to obtain interference-canceled symbols. UE 120 may then repeat the same processing on the interference-canceled symbols (instead of the received symbols) to recover data for the next codeword. With SIC, each codeword that is recovered later may experience less interference and hence may observe higher signal quality. The terms signal quality and channel quality may be used interchangeably, and signal quality may be quantified by signal-to-noise-and-interference ratio (SINR) or some other metric. The K codewords may thus achieve different SINRs with SIC. The SINR of each codeword may be dependent on (i) the SINR of that codeword with MIMO detection, (ii) the particular iteration/stage in which the codeword is recovered, and (iii) the interference due to codewords (if any) not yet recovered.

For clarity, in the description below, an MMSE UE is a UE that observes similar SINRs for all codewords transmitted with large delay CDD. An SIC-capable UE is a UE that may observe different SINRs for different codewords transmitted with large delay CDD. For a given transmission of multiple codewords with spatial multiplexing and large delay CDD, an MMSE UE may obtain similar SINRs for these codewords whereas a SIC-capable UE may obtain different SINRs for these codewords. This difference may be due to the different receiver processing techniques used by the MMSE UE and the SIC-capable UE.

For the design shown in Table 1, when large delay CDD is selected, two codewords may be sent on two, three, or four layers. The spatial processing for large delay CDD at eNB 110 introduces diversity so that all L layers should achieve similar received SINRs at UE 120. In this case, UE 120 may generate a single CQI (i.e., a single CQI value) and may send this CQI as feedback to eNB 110. eNB 110 may select an MCS based on the CQI and may process each of the two codewords based on the selected MCS.

The feedback of a single CQI for multiple codewords may provide acceptable performance when the codewords observe similar SINRs. However, if the multiple codewords can observe different SINRs (e.g., due to SIC), then there may be ambiguity on how to generate and interpret the single CQI for the multiple codewords.

In an aspect, a plurality of CQI computation methods may be supported, and each CQI computation method may indicate how CQI should be computed. One CQI computation method may be selected for use. CQI may then be computed and reported in accordance with the selected CQI computation method. This may avoid ambiguity in generating and interpreting a single CQI for multiple codewords.

In an exemplary design, two CQI computation methods may be supported, as follows:
- First CQI computation method—compute CQI for a specific codeword, and
- Second CQI computation method—compute CQI by averaging across layers.

Different and/or additional CQI computation methods may also be supported.

The first or second CQI computation method may be selected for use in various manners. In one design, eNB 110 may select a CQI computation method based on various factors such as UE capability, channel conditions, etc. UE capability may include SIC capability and/or other capability that can result in different CQIs for different codewords. For example, eNB 110 may select the first CQI computation method if UE 120 supports SIC and may select the second CQI computation method if UE 120 does not support SIC. eNB 110 may send the selected CQI computation method to UE 120, which may compute CQI in accordance with the selected CQI computation method and its capability.

In another design, UE 120 may select a CQI computation method and may send the selected CQI computation method and its capability to eNB 110. eNB 110 may interpret the CQI from UE 120 based on the selected CQI computation method and the UE capability.

For the first CQI computation method, the specific codeword for which CQI is computed may be determined in various manners. In a first design, the specific codeword may be specified in a standard and may be known a priori by both eNB 110 and UE 120. For example, the specific codeword may be the first codeword. In a second design, the specific codeword may be selected by one entity and signaled to the other entity. For example, eNB 110 may select CQI feedback for the first codeword, or the second codeword, or some other codeword and may signal the selected codeword to UE 120. Alternatively, UE 120 may select the specific codeword and may signal the selected codeword to eNB 110. The second design may allow for computation and feedback of CQI for a specific codeword of greater interest among multiple codewords being sent simultaneously. In a third design, the specific codeword may change over time, e.g., based on a predetermined pattern. For example, CQI may be computed and reported for two codewords in an alternate manner, e.g., for the first codeword in one CQI reporting period, then for the second codeword in the next CQI reporting period, then for the first codeword in the following CQI reporting period, etc. The third design may allow for computation and feedback of CQIs for different codewords in a time division multiplexed (TDM) manner. The third design may be especially applicable for a relatively static channel.

For the first CQI computation method, an MMSE UE may compute CQI for the specific codeword based on the SINRs of all layer(s) used for the codeword. The MMSE UE may observe similar SINRs for all layers with large delay CDD. However, the MMSE UE may compute CQI based on the SINRs of only the layer(s) used for the specific codeword.

For the first CQI computation method, a SIC-capable UE may compute CQI for the specific codeword based on the SINRs of all layer(s) used for the codeword. The SIC-capable UE may observe different SINRs for different layers used for different codewords, even with large delay CDD. The SIC-capable UE may compute CQI for the specific codeword based on the SINRs of only the layer(s) used for the codeword. If the specific codeword is the first codeword to be decoded, then the SIC-capable UE may compute CQI based on the layer(s) used for the first codeword, with SIC not having any impact on the first codeword. If the specific codeword is the second codeword to be decoded, then the SIC-capable UE may compute CQI based on the layer(s) used for the second codeword after applying interference cancellation for the first codeword. SIC may thus have an impact on the CQI of each codeword except for the first codeword. The first codeword may observe less fluctuation in SINR than each remaining codeword. Hence, a more accurate CQI may be obtained for the first codeword than each remaining codeword.

For the second CQI computation method, an MMSE UE may compute CQI by averaging SINRs across all layers used for transmission. The MMSE UE may observe similar SINRs for all layers with large delay CDD. The MMSE UE may obtain a more accurate CQI by averaging SINRs across all layers. The more accurate CQI may improve performance of data transmission.

For the second CQI computation method, a SIC-capable UE may average SINRs across all layers in various manners. In one design, the SIC-capable UE may average SINRs across layers with SIC applied. As an example, two codewords may be sent on three layers, with the first codeword being sent on layer 1, and the second codeword being sent on layers 2 and 3. The SIC-capable UE may obtain an SINR of X for layer 1 and an SINR of Y for each of layers 2 and 3, where X and Y may be in units of decibel (dB). An average SINR Z may then be computed as Z=(X+2Y)/3. Alternatively, the average SINR Z may be computed based on data rates supported by the three layers. If the supported data rate corresponding to an SINR of x is denoted as $f(x)$, then the overall data rate for the three layers in the example above may be given as $C=f(X)+2f(Y)$. The average SINR may then be given by $Z=f^{-1}(C/3)$, where $f^{-1}( )$ is an inverse function of $f( )$. Averaging may also be performed in other manners. In any case, the CQI may be determined based on the average SNR Z. In another design, the SIC-capable UE may average SINRs across layers with SIC not applied. In this design, the average SINR obtained by the SIC-capable UE with SIC not applied may be similar to the average SINR obtained by the MMSE UE.

Table 2 summarizes CQI computation by the MMSE UE and the SIC-capable UE for the first and second CQI computation methods.

TABLE 2

| | CQI Computation | |
|---|---|---|
| | MMSE UE | SIC-Capable UE |
| First CQI Computation Method | Compute CQI for a specific codeword based on SINRs of layers used for the codeword. | Compute CQI for first codeword without SIC, or Compute CQI for second codeword with SIC. |
| Second CQI Computation Method | Compute CQI by averaging SINRs across all layers. | Compute CQI by averaging SINRs across layers without SIC, or Compute CQI by averaging SINRs across layers with SIC. |

As shown in Table 2, for each CQI computation method, the SIC-capable UE may compute CQI in one of several manners. The actual CQI of the first codeword and/or the actual CQI of the second codeword with SIC may be different from the computed CQI. In one design, the difference between the actual CQI or SINR of each codeword and the computed CQI or SINR may be estimated by the SIC-capable UE and reported to the eNB, e.g., only once or at a slow rate. The difference may be relatively static and may allow the eNB to estimate the actual CQI of each codeword based on the computed CQI. In another design, the eNB may (i) estimate the difference between the actual CQI or SINR of each codeword and the computed CQI or SINR and/or (ii) account for this difference when processing codewords.

eNB 110 may receive a single CQI for multiple codewords from UE 120. eNB 110 may process and transmit data in different manners depending on which CQI computation method is selected for use, the capability of UE 120 (e.g., whether UE 120 is an MMSE UE or a SIC-capable UE), which specific codeword is selected (if applicable), and/or other factors.

If UE 120 is an MMSE UE, then the CQI received from UE 120 may be indicative of the SINR achieved by each codeword, regardless of whether the first or second CQI computation method is selected. eNB 110 may select an MCS based on the received CQI, process (e.g., encode and modulate) each codeword based on the selected MCS, and send each codeword to UE 120.

If UE 120 is a SIC-capable UE, then the CQI received from UE 120 may be interpreted in different manners. If the first CQI computation method is selected, then UE 120 may compute the CQI for the first or second codeword with SIC. If the CQI is for the first codeword, then eNB 110 may select an MCS for the first codeword based on the received CQI and may process this codeword based on the selected MCS. The second codeword may observe a higher SINR than the first codeword. eNB 110 may also use the selected MCS for the second codeword. Alternatively, eNB 110 may use another MCS corresponding to higher SINR for the second codeword. If the CQI is for the second codeword, then eNB 110 may select an MCS for the second codeword based on the received CQI and may process this codeword based on the selected MCS. The first codeword may observe a lower SINR than the second codeword. eNB 110 may also use the selected MCS for the first codeword. Alternatively, eNB 110 may use another MCS corresponding to the lower SINR for the first codeword.

If UE 120 is a SIC-capable UE and the second CQI computation method is selected, then UE 120 may compute CQI by averaging SINRs across layers with or without SIC. If UE 120 averages SINRs without SIC, then the CQI may reflect the SINR of the first codeword. eNB 110 may select an MCS for the first codeword based on the received CQI and may process this codeword based on the selected MCS. The second codeword may observe a higher SINR than the first codeword. eNB 110 may use the selected MCS or another MCS corresponding to the higher SINR for the second codeword. If UE 120 averages SINRs with SIC, then the CQI may be an optimistic estimate of the SINR of the first codeword and a pessimistic estimate of the SINR of the second codeword. eNB 110 may select an MCS based on the received CQI and may process the first codeword based on the selected MCS or another MCS for a lower SINR. eNB 110 may process the second codeword based on the selected MCS or another MCS for a higher SINR. eNB 110 may also select an MCS for each codeword in other manners.

eNB 110 may transmit one or more codewords to UE 120 with hybrid automatic retransmission (HARQ). For HARQ, eNB 110 may send one or more transmissions of a codeword until the codeword is decoded correctly by UE 120 or some other termination condition is encountered. For each transmission of the codeword, UE 120 may send an acknowledgement (ACK) if the codeword is decoded correctly or a negative acknowledgement (NACK) if the codeword is decoded in error. eNB 110 may send another transmission of the codeword if an ACK is received or may terminate transmission of the codeword if a NACK is received. eNB 110 may transmit multiple codewords to UE 120 and may select an MCS for each codeword such that all codewords terminate with sufficiently high probability after a particular number of transmissions, which may be referred to as a target termination.

Figure 3:
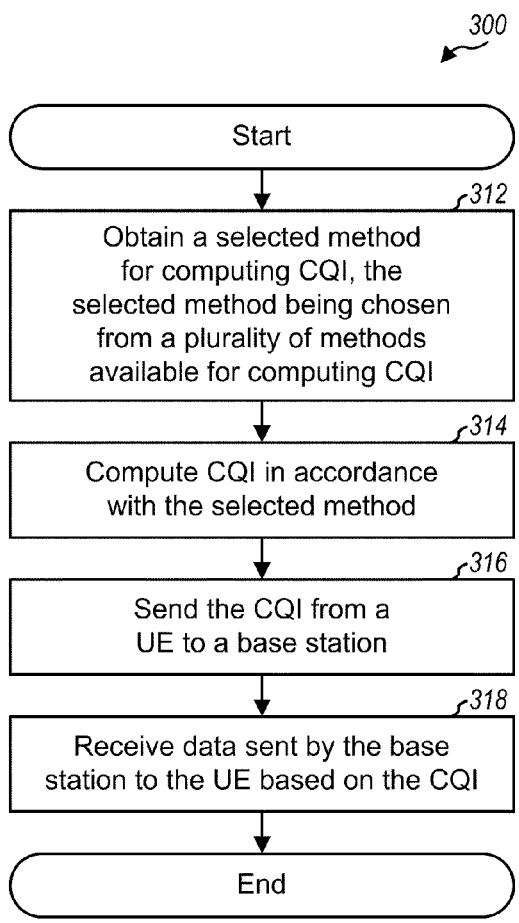
FIGS. 3 and 4 show a process and an apparatus, respectively, for computing and reporting CQI and receiving data.

FIG. 3 shows a design of a process 300 for computing and reporting CQI and receiving data in a communication network. Process 300 may be performed by a UE (as described below) or by some other entity. The UE may obtain a selected method for computing CQI, with the selected method being chosen from a plurality of methods available for computing CQI (block 312). The selected method may be (i) chosen by a base station and signaled to the UE or (ii) choose by the UE and signaled to the base station. The selected method may be chosen based on receiver processing capability of the UE (e.g., whether or not the UE supports SIC) and/or other factors. The UE may signal its capability (e.g., its SIC capability) to the base station.

The plurality of methods may include (i) a first method for computing CQI without averaging signal quality across layers used for different codewords and (ii) a second method for computing CQI by averaging signal quality across layers used for different codewords. The plurality of methods may also comprise other methods for computing CQI.

The UE may compute CQI in accordance with the selected method (block 314). In one design, the selected method may specify CQI computation for a specific codeword among a plurality of codewords. The specific codeword may be the first codeword to be decoded (or some other codeword) among the plurality of codewords. The specific codeword may also be determined (i) by the base station and signaled to the UE or (ii) by the UE and signaled to the base station. In any case, the UE may compute CQI for the specific codeword based on its receiver processing capability. If the UE supports SIC, then the UE may (i) compute CQI without interference cancellation if the specific codeword is the first codeword or (ii) compute CQI with interference cancellation if the specific codeword is the second codeword. Regardless of its capability, the UE may determine signal quality of at least one layer used for the specific codeword and may compute CQI for the specific codeword based on the signal quality of the at least one layer. The UE may have similar CQIs for the plurality of codewords (due to its receiver processing capability and/or spatial processing by the base station) and may compute CQI for only the specific codeword. Alternatively, the UE may have different CQIs for the plurality of codewords and may compute CQI for only the specific codeword.

In another design, the selected method may specify CQI computation by averaging signal quality across a plurality of layers used for transmission. In this case, the UE may determine signal qualities of the plurality of layers based on its receiver processing capability. The UE may then compute CQI based on an average of the signal qualities of the plurality of layers. If the UE supports SIC, then the UE may determine the signal quality of at least one layer used for the first codeword without interference cancellation and may determine the signal quality of at least one additional layer used for the second codeword with interference cancellation.

The UE may send the CQI to the base station (block 316). The UE may thereafter receive data (e.g., the plurality of codewords) sent by the base station based on the CQI (block 318).

Figure 4:
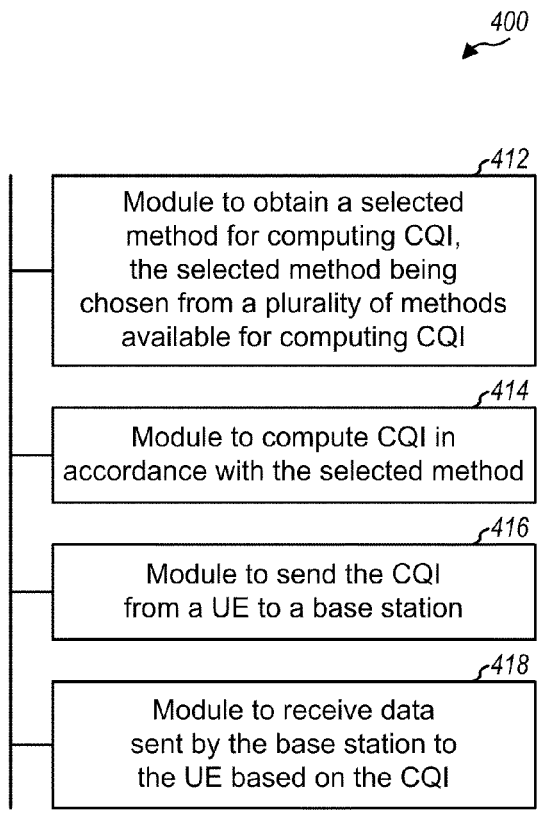

FIG. 4 shows a design of an apparatus 400 for computing and reporting CQI and receiving data in a communication network. Apparatus 400 includes a module 412 to obtain a selected method for computing CQI, with the selected method being chosen from a plurality of methods available for computing CQI, a module 414 to compute CQI in accordance with the selected method, a module 416 to send the CQI from a UE to a base station, and a module 418 to receive data sent by the base station to the UE based on the CQI.

FIG. 5 shows a design of a process 500 for receiving CQI and transmitting data in a communication network. Process 500 may be performed by a base station/eNB (as described below) or by some other entity. The base station may determine a selected method for computing CQI by a UE, with the selected method being chosen from a plurality of methods available for computing CQI (block 512). The selected method may be (i) chosen by the base station and signaled to the UE or (ii) chosen by the UE and signaled to the base station. The base station may receive CQI computed by the UE in accordance with the selected method (block 514). The base station may send data to the UE based on the received CQI (block 516).

In one design, the selected method may specify CQI computation for a specific codeword among a plurality of codewords. The received CQI may be for the specific codeword. The UE may observe similar signal qualities for the plurality of codewords, e.g., due to its capability and/or spatial processing by the base station. For block 516, the base station may determine an MCS based on the received CQI and may process each of the plurality of codewords based on the MCS. Alternatively, the UE may observe different signal qualities for the plurality of codewords, e.g., due to its SIC capability and/or spatial processing by the base station. For block 516, the base station may determine an MCS for the specific codeword based on the received CQI, determine another MCS for another codeword based on the received CQI, and process each codeword based on the MCS for that codeword. The two MCSs may be different and may be selected as described above.

In another design, the selected method may specify CQI computation by averaging signal quality across a plurality of layers used for transmission. For block 516, the base station may determine at least one MCS for a plurality of codewords based on the received CQI. The base station may then process the plurality of codewords based on the at least one MCS. If the UE observes similar signal qualities for the plurality of codewords, then the base station may determine a single MCS based on the received CQI and may process each codeword based on the MCS. If the UE observes different signal qualities for the plurality of codewords, then the base station may determine an MCS for each codeword based on the received CQI, as described above, and may process each codeword based on the MCS for that codeword.

FIG. 6 shows a design of an apparatus 600 for receiving CQI and transmitting data in a communication network. Apparatus 600 includes a module 612 to determine a selected method for computing CQI, with the selected method being chosen from a plurality of methods available for computing CQI, a module 614 to receive CQI computed by a UE in accordance with the selected method, and a module 616 to send data from a base station to the UE based on the received CQI.

The modules in FIGS. 4 and 6 may comprise processors, electronic devices, hardware devices, electronic components, logical circuits, memories, software codes, firmware codes, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   obtaining a selected method for computing channel quality indication (CQI), the selected method being chosen from a plurality of methods available for computing CQI, the selected method being for computing CQI for a specific codeword among a plurality of selectable codewords of a plurality of codewords;
   computing CQI in accordance with the selected method; and
   sending the CQI from a user equipment (UE) to a base station.

2. The method of claim 1, wherein the plurality of methods include a first method for computing CQI without averaging signal quality across layers used for different codewords and a second method for computing CQI by averaging signal quality across layers used for different codewords.

3. The method of claim 1, wherein the specific codeword is a first codeword among the plurality of codewords.

4. The method of claim 1, wherein the computing CQI comprises computing CQI for the specific codeword based on receiver processing capability of the UE.

5. The method of claim 1, wherein the UE supports successive interference cancellation (SIC), and wherein the computing CQI comprises
    computing CQI without interference cancellation if the specific codeword is a first codeword among the plurality of codewords, and
    computing CQI with interference cancellation if the specific codeword is a second codeword among the plurality of codewords.

6. The method of claim 1, wherein the computing CQI comprises
    determining signal quality of at least one layer used for the specific codeword, and
    computing CQI for the specific codeword based on the signal quality of the at least one layer used for the specific codeword.

7. The method of claim 1, wherein the specific codeword is mapped to a plurality of layers used for transmission and the selected method is also for computing the CQI by averaging signal quality across the plurality of layers used for transmission.

8. The method of claim 7, wherein the computing CQI comprises
    determining signal qualities of the plurality of layers based on receiver processing capability of the UE, and
    computing CQI based on an average of the signal qualities of the plurality of layers.

9. The method of claim 8, wherein the UE supports successive interference cancellation (SIC), and wherein the determining the signal qualities of the plurality of layers comprises
    determining signal quality of at least one layer used for a first codeword without interference cancellation, and
    determining signal quality of at least one additional layer used for a second codeword with interference cancellation.

10. The method of claim 1, further comprising: receiving a plurality of codewords sent by the base station to the UE based on the CQI.

11. An apparatus for wireless communication, comprising:
    means for obtaining a selected method for computing channel quality indication (CQI), the selected method being chosen from a plurality of methods available for computing CQI, the selected method being for computing CQI for a specific codeword among a plurality of selectable codewords of a plurality of codewords;
    means for computing CQI in accordance with the selected method; and
    means for sending the CQI from a user equipment (UE) to a base station.

12. The apparatus of claim 11, wherein the means for computing CQI comprises means for computing CQI for the specific codeword based on receiver processing capability of the UE.

13. The apparatus of claim 12, wherein the UE supports successive interference cancellation (SIC), and wherein the means for computing CQI comprises
    means for computing CQI without interference cancellation if the specific codeword is a first codeword among the plurality of codewords, and
    means for computing CQI with interference cancellation if the specific codeword is a second codeword among the plurality of codewords.

14. The apparatus of claim 11, wherein the specific codeword is mapped to a plurality of layers used for transmission and the selected method is also for computing CQI by averaging signal quality across the plurality of layers used for transmission, and wherein the means for computing CQI comprises
    means for determining signal qualities of the plurality of layers based on receiver processing capability of the UE, and
    means for computing CQI based on an average of the signal qualities of the plurality of layers.

15. The apparatus of claim 14, wherein the UE supports successive interference cancellation (SIC), and wherein the means for determining the signal qualities of the plurality of layers comprises
    means for determining signal quality of at least one layer used for a first codeword without interference cancellation, and
    means for determining signal quality of at least one additional layer used for a second codeword with interference cancellation.

16. An apparatus for wireless communication, comprising:
    at least one processor configured to obtain a selected method for computing channel quality indication (CQI), the selected method being chosen from a plurality of methods available for computing CQI, the selected method being for computing CQI for a specific codeword among a plurality of selectable codewords of a plurality of codewords; to compute CQI in accordance with the selected method; and to send the CQI from a user equipment (UE) to a base station.

17. The apparatus of claim 16, wherein the at least one processor is configured to compute CQI for the specific codeword based on receiver processing capability of the UE.

18. The apparatus of claim 17, wherein the UE supports successive interference cancellation (SIC), and wherein the at least one processor is configured to compute CQI without interference cancellation if the specific codeword is a first codeword among the plurality of codewords, and to compute CQI with interference cancellation if the specific codeword is a second codeword among the plurality of codewords.

19. The apparatus of claim 16, wherein the specific codeword is mapped to a plurality of layers used for transmission and the selected method is also for computing CQI by averaging signal quality across the plurality of layers used for transmission, and wherein the at least one processor is configured to determine signal qualities of the plurality of layers based on receiver processing capability of the UE, and to compute CQI based on an average of the signal qualities of the plurality of layers.

20. The apparatus of claim 19, wherein the UE supports successive interference cancellation (SIC), and wherein the at least one processor is configured to determine signal quality of at least one layer used for a first codeword without interference cancellation, and to determine signal quality of at least one additional layer used for a second codeword with interference cancellation.

21. A computer program product, comprising: a non-transitory computer-readable medium comprising:
    code for causing at least one processor to obtain a selected method for computing channel quality indication (CQI), the selected method being chosen from a plurality of methods available for computing CQI, the selected method being for computing CQI for a specific codeword among a plurality of selectable codewords of a plurality of codewords;

code for causing the at least one processor to compute CQI in accordance with the selected method; and code for causing the at least one processor to send the CQI from a user equipment (UE) to a base station.

22. A method for wireless communication, comprising:

determining a selected method for computing channel quality indication (CQI), the selected method being chosen from a plurality of methods available for computing CQI, the selected method being for computing CQI for a specific codeword among a plurality of selectable codewords of a plurality of codewords;

receiving CQI computed by a user equipment (UE) in accordance with the selected method; and sending data from a base station to the UE based on the received CQI.

23. The method of claim 22, wherein the received CQI is for the specific codeword.

24. The method of claim 23, wherein the UE observes similar signal qualities for the plurality of codewords, and wherein the sending data comprises determining a modulation and coding scheme (MCS) based on the received CQI, and processing each of the plurality of codewords based on the MCS.

25. The method of claim 23, wherein the UE observes different signal qualities for the plurality of codewords, and wherein the sending data comprises determining a modulation and coding scheme (MCS) for the specific codeword based on the received CQI, determining another MCS for another codeword based on the received CQI, and processing each codeword based on the MCS determined for the codeword.

26. The method of claim 22, wherein the specific codeword is mapped to a plurality of layers used for transmission and the selected method is also for computing CQI by averaging signal quality across the plurality of layers used for transmission.

27. The method of claim 26, wherein the sending data comprises determining at least one modulation and coding scheme (MCS) for a plurality of codewords based on the received CQI, and processing the plurality of codewords based on the at least one MCS.

28. The method of claim 22, wherein the determining the selected method for computing CQI comprises choosing the selected method by the base station for the UE.

29. The method of claim 22, wherein the selected method is chosen based on receiver processing capability of the UE, and wherein the receiver processing capability of the UE includes whether or not the UE supports successive interference cancellation (SIC).

30. An apparatus for wireless communication, comprising:

means for determining a selected method for computing channel quality indication (CQI), the selected method being chosen from a plurality of methods available for computing CQI, the selected method being for computing CQI for a specific codeword among a plurality of selectable codewords of a plurality of codewords;

means for receiving CQI computed by a user equipment (UE) in accordance with the selected method; and means for sending data from a base station to the UE based on the received CQI.

31. The apparatus of claim 30, wherein the received CQI is for the specific codeword.

32. The apparatus of claim 30, wherein the specific codeword is mapped to a plurality of layers used for transmission and the selected method is also for computing CQI by averaging signal quality across the plurality of layers used for transmission, and wherein the received CQI is determined based on an average of signal qualities of the plurality of layers.

33. The apparatus of claim 30, wherein the means for sending data comprises means for determining a modulation and coding scheme (MCS) based on the received CQI, and means for processing each of a plurality of codewords based on the MCS.

34. The apparatus of claim 30, wherein the means for sending data comprises means for determining at least two modulation and coding schemes (MCSs) based on the received CQI, and means for processing a plurality of codewords based on the at least two MCSs.

35. An apparatus for wireless communication, comprising:

at least one processor configured to:

determine a selected method for computing channel quality indication (CQI), the selected method being chosen from a plurality of methods available for computing CQI, the selected method being for computing CQI for a specific codeword among a plurality of selectable codewords of a plurality of codewords;

receive CQI computed by a user equipment (UE) in accordance with the selected method; and send data from a base station to the UE based on the received CQI.

36. A computer program product, comprising:

a non-transitory computer-readable medium comprising code for causing at least one processor to:

determine a selected method for computing channel quality indication (CQI), the selected method being chosen from a plurality of methods available for computing CQI, the selected method being for computing CQI for a specific codeword among a plurality of selectable codewords of a plurality of codewords;

receive CQI computed by a user equipment (UE) in accordance with the selected method; and send data from a base station to the UE based on the received CQI.

* * * * *